(12) United States Patent
Choi et al.

(10) Patent No.: US 10,728,026 B2
(45) Date of Patent: Jul. 28, 2020

(54) DATA MANAGEMENT METHOD

(71) Applicant: Samsung Electronics Co., Ltd., Suwon-si, Gyeonggi-do (KR)

(72) Inventors: Hye Hyun Choi, Suwon-si (KR); Bo Gyeong Kang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 198 days.

(21) Appl. No.: 15/797,401

(22) Filed: Oct. 30, 2017

(65) Prior Publication Data
US 2018/0145829 A1 May 24, 2018

(30) Foreign Application Priority Data

Nov. 24, 2016 (KR) .................. 10-2016-0157603
Mar. 6, 2017 (KR) .................. 10-2017-0028174

(51) Int. Cl.
| H04L 29/06 | (2006.01) |
| H04L 9/08 | (2006.01) |
| H04L 9/14 | (2006.01) |
| H04L 9/06 | (2006.01) |
| H04L 9/32 | (2006.01) |

(52) U.S. Cl.
CPC .......... *H04L 9/0822* (2013.01); *H04L 9/0631* (2013.01); *H04L 9/0637* (2013.01); *H04L 9/0894* (2013.01); *H04L 9/0897* (2013.01); *H04L 9/14* (2013.01); *H04L 9/3242* (2013.01); *H04L 63/0428* (2013.01); *H04L 63/0435* (2013.01); *H04L 63/062* (2013.01); *H04L 63/123* (2013.01); *H04L 2209/12* (2013.01); *H04L 2463/062* (2013.01)

(58) Field of Classification Search
CPC . H04L 63/0435; H04L 63/062; H04L 63/123; H04L 9/0897; H04L 9/3242; H04L 63/0428; H04L 9/0894; H04L 9/14; H04L 9/0637; H04L 9/0631; H04L 9/0822; H04L 2463/062; H04L 2209/12
See application file for complete search history.

(56) References Cited

U.S. PATENT DOCUMENTS

| 8,280,043 | B2 * | 10/2012 | Cerruti | G06F 21/602 380/239 |
| 10,312,091 | B1 * | 6/2019 | Smayling | H01L 21/263 |
| 2006/0173794 | A1 * | 8/2006 | Sellars | G06F 21/10 705/76 |
| 2007/0113070 | A1 * | 5/2007 | Lackritz | B60G 17/018 713/151 |
| 2007/0235517 | A1 * | 10/2007 | O'Connor | G06Q 10/06 235/375 |
| 2008/0205651 | A1 * | 8/2008 | Goto | G06F 21/71 380/277 |
| 2009/0323971 | A1 * | 12/2009 | Munguia | H04L 63/061 380/284 |

(Continued)

*Primary Examiner* — Don G Zhao
(74) *Attorney, Agent, or Firm* — Harness, Dickey & Pierce, P.L.C.

(57) ABSTRACT

A data management method includes decrypting the first encryption key using the second encryption in response to receiving the first encryption key, decrypting the data by using the first encryption key in response to receiving the data encrypted with the first encryption key, and encrypting the data with the third encryption key and transmitting the data externally.

20 Claims, 6 Drawing Sheets

(56) References Cited

U.S. PATENT DOCUMENTS

| | | | |
|---|---|---|---|
| 2010/0189265 A1* | 7/2010 | Ito | H04L 9/0822 380/285 |
| 2012/0079279 A1* | 3/2012 | Leclercq | H04L 9/0825 713/187 |
| 2012/0297200 A1* | 11/2012 | Thom | G06F 21/57 713/189 |
| 2012/0310867 A1* | 12/2012 | Lim | G08C 19/28 706/12 |
| 2013/0318347 A1* | 11/2013 | Moffat | H04L 63/06 713/168 |
| 2013/0339734 A1* | 12/2013 | Vernia | H04L 63/0428 713/168 |
| 2014/0258724 A1* | 9/2014 | Lambert | H04L 63/062 713/170 |
| 2015/0113599 A1* | 4/2015 | Curtis | H04L 63/0428 726/4 |
| 2015/0113627 A1* | 4/2015 | Curtis | H04L 63/06 726/10 |
| 2015/0242614 A1* | 8/2015 | Scagnol | H04L 43/065 726/2 |
| 2015/0312041 A1* | 10/2015 | Choi | H04L 9/3231 713/175 |
| 2016/0072808 A1* | 3/2016 | David | H04L 9/3268 713/158 |
| 2016/0094548 A1 | 3/2016 | Lee et al. | |
| 2016/0226831 A1* | 8/2016 | Kim | H04L 63/062 |
| 2016/0277374 A1* | 9/2016 | Reid | H04L 63/061 |
| 2016/0373257 A1* | 12/2016 | Adrangi | H04L 9/321 |
| 2016/0373418 A1* | 12/2016 | Stahl | G06F 21/33 |
| 2017/0006034 A1* | 1/2017 | Link, II | H04L 61/2592 |
| 2017/0055148 A1* | 2/2017 | Zimmerman | H04W 4/70 |
| 2017/0126402 A1* | 5/2017 | Medvinsky | H04L 9/0631 |
| 2017/0142082 A1* | 5/2017 | Qian | G06F 21/62 |
| 2017/0147808 A1* | 5/2017 | Kravitz | G06F 21/45 |
| 2017/0163417 A1* | 6/2017 | McLean | H04L 9/0877 |
| 2017/0171164 A1* | 6/2017 | Alexander | H04L 63/0823 |
| 2017/0171747 A1* | 6/2017 | Britt | H04W 12/04 |
| 2017/0200225 A1* | 7/2017 | Kanungo | G06Q 40/04 |
| 2017/0222815 A1* | 8/2017 | Meriac | G06F 21/554 |
| 2017/0272945 A1* | 9/2017 | Link, II | H04W 4/70 |
| 2017/0359174 A1* | 12/2017 | Tamura | G06F 21/6218 |
| 2018/0152420 A1* | 5/2018 | Britt | H04L 63/062 |
| 2018/0248692 A1* | 8/2018 | Henderson | H04L 9/0869 |
| 2018/0337899 A1* | 11/2018 | Becker | H04L 63/0457 |
| 2019/0007204 A1* | 1/2019 | Field | H04L 63/0428 |

* cited by examiner

DATA MANAGEMENT METHOD

CROSS-REFERENCE TO RELATED APPLICATION

This application claims benefit of priority to Korean Patent Application No. 10-2016-0157603, filed on Nov. 24, 2016 and Korean Patent Application No. 10-2017-0028174, filed on Mar. 6, 2017 in the Korean Intellectual Property Office, the disclosure of which is incorporated herein by reference in its entirety.

BACKGROUND

1. Field

The present inventive concepts relate to a data management method.

2. Description of Related Art

As electronic devices equipped with the Internet of Things (IoT) function are becoming widespread, a demand for storing information and data required for setting and providing the IoT function in a manufacturing process of an electronic device has been increasing. Electronic devices equipped with the IoT function are required to send and receive data while blocking a risk of leakage caused by hacking, or the like, and thus data required for setting and providing the IoT function should not be leaked to the outside during a process in which the data is stored in an electronic device.

SUMMARY

An aspect of the present inventive concepts may provide a method for significantly reducing risk of external leakage or hacking of data in a manufacturing process of an electronic device, and storing data required for setting or providing an Internet of Things function in the electronic device.

According to an aspect of the present inventive concepts, a data management method includes decrypting a first encryption key by using a second encryption key in response to receiving the first encryption key, decrypting data by using the first encryption key in response to receiving the data encrypted with the first encryption key, and encrypting the data with the third encryption key and transmitting the data encrypted with the third encryption key externally.

According to an example embodiment of the present inventive concepts, a data management method for inputting to an electronic device for providing an Internet of Things (IoT) function, the method including, receiving an encryption key encrypted with a first transmission key and the data encrypted with the encryption key, decrypting the encryption key by using the first transmission key which is input directly, decrypting the data with the encryption key; encrypting the data by using a second transmission key, different from the first transmission key, and inputting the data to the electronic device after encoding the data encrypted with the second transmission key in a transmission format.

According to an example embodiment of the present inventive concepts, a data management method includes, receiving, via direct input, a first key and a second key, receiving a third key encrypted with the first key, decrypting the third key using the first key, receiving data encrypted with the third key, decrypting the data with the third key, encrypting the data with the second key, and inputting the data to an electronic device.

BRIEF DESCRIPTION OF DRAWINGS

The above and other example embodiments, features and other advantages of the present inventive concepts will be more clearly understood from the following detailed description, taken in conjunction with the accompanying drawings, in which.

DETAILED DESCRIPTION

Figure 1:
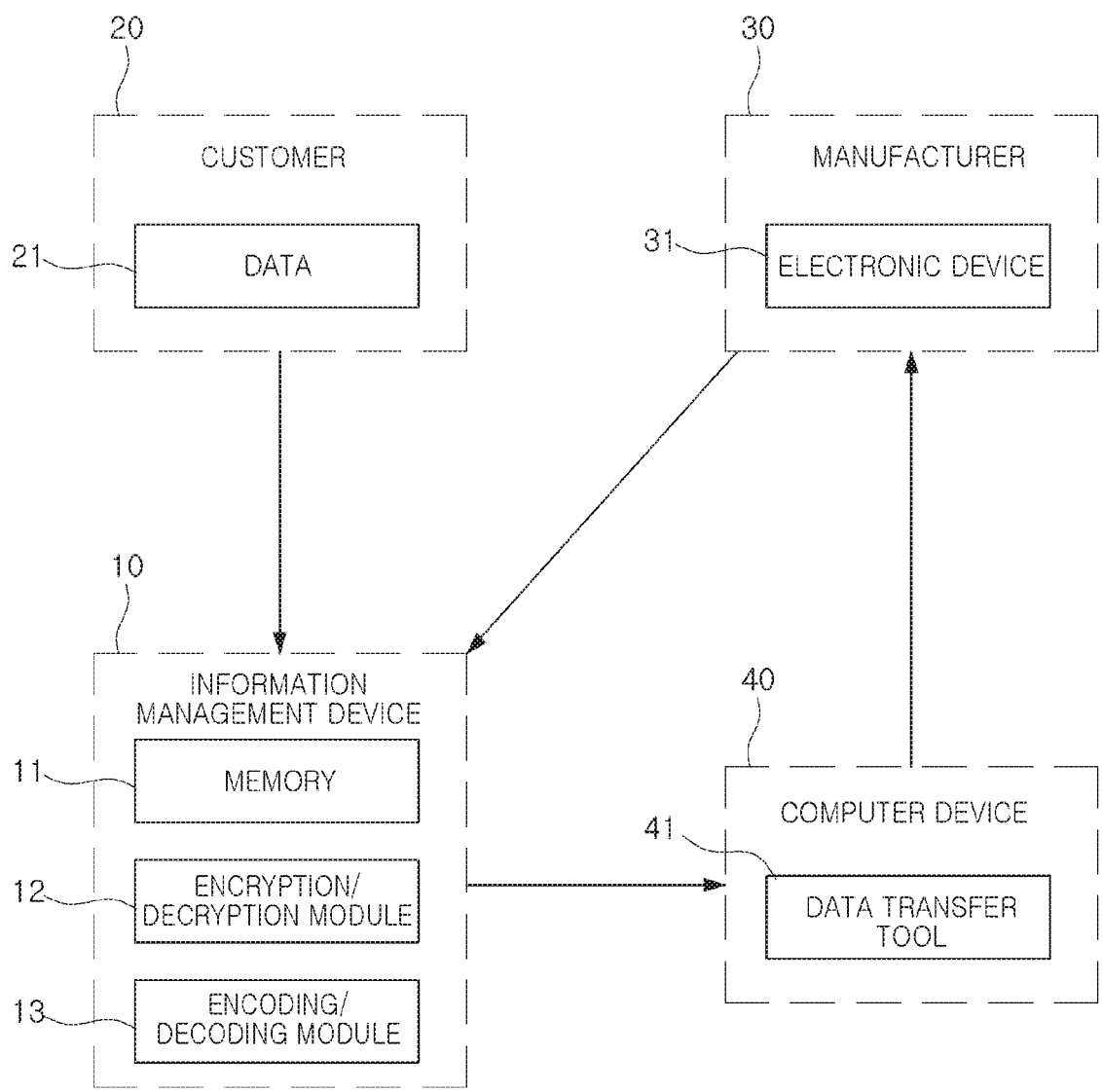
FIG. 1 is a schematic view illustrating an environment to which a data management method according to some example embodiments is applied.

Some example embodiments of the present inventive concepts will now be described in detail with reference to the accompanying drawings.

It will be also understood that although the terms first, second, third etc. may be used herein to describe various elements, these elements should not be limited by these terms. These terms are only used to distinguish one element from another element. Thus, a first element in some example embodiments could be termed a second element in other example embodiments without departing from the teachings of the present invention. Example embodiments of aspects of the present inventive concepts explained and illustrated herein include their complementary counterparts. The same reference numerals or the same reference designators denote the same elements throughout the specification.

FIG. 1 is a schematic view illustrating an environment to which a data management method according to some example embodiments is applied.

With reference to FIG. 1, a data management method according to some example embodiments may be executed by an information management device 10. The data management method according to some example embodiments may be a method provided to safely store data 21 provided by a buyer 20 in an electronic device 31. A data management company having the information management device 10 may provide the data management method according to some example embodiments, the electronic device 31 is manufactured by a manufacturer 30, and the electronic device 31 may be sold to the buyer 20.

In some example embodiments, the buyer 20 may be a subject who purchases the electronic device 31 manufactured and sold by the manufacturer 30, and then produces a product to be sold to an end-user. The electronic device 31 may be a finished product which may be operated by itself, or may be a module in the form of a half-finished product which may be operated by itself. The half-finished product may be manufactured as a finished product after an additional production process. In some example embodiments, the electronic device 31 may include a central processing unit (CPU) having computing ability, an application processor (AP), a memory for storing the data 21, or the like.

The buyer 20 may create the data 21 to be stored in the electronic device 31 manufactured by the manufacturer 30, and then may provide the data to a data management company having the information management device 10. The information management device 10 may include a memory 11, an encryption/decryption module 12, an encoding/decoding module 13, and the like. In some example embodiments, the buyer 20 may encrypt the data 21 with a predetermined or desired encryption key, and then may transmit the data to the information management device 10. In addition, the encryption/decryption module 12 of the information management device 10 may decrypt the data 21 that has been received, and then may store the data in the memory 11.

The data 21 created by the buyer 20 may be input to the electronic device 31 by a data transfer tool 41. In some example embodiments illustrated in FIG. 1, the data transfer tool 41 may be an application or a program executed on a computer device 40, different from the information management device 10. Alternatively, in some example embodiments, the data transfer tool 41 may be an application or a program executed on the information management device 10.

After the information management device 10 encrypts the data 21 with a predetermined or desired encryption key, the data is encoded in a format to be processed by the data transfer tool 41, to be transmitted to the computer device 40. An encryption key, used when the information management device 10 encrypts the data 21, may be different from an encryption key encrypting the data 21 which the information management device 10 receives from the buyer 20. In some example embodiments, the encryption key, used when the information management device 10 encrypts the data 21, may be provided by the manufacturer 30, and the encryption key encrypting the data 21 which the information management device 10 receives from the buyer 20 may be provided by the buyer 20.

The data 21, input to the electronic device 31 by the data transfer tool 41, may be encoded in a specific transmission format. In some example embodiments, the transmission format may include verification information for confirming whether the data 21 has been input normally to the electronic device 31. After the electronic device 31 receives the data 21, as the transmission format is decoded to extract the verification information, the electronic device determines whether the data 21 has been input normally.

In some example embodiments, the information management device 10 may be a Hardware Security Module (HSM). The information management device 10 may include at least one processor, at least one security element and the like, or may perform an encrypting/decrypting function for decrypting data that has been encrypted or encrypting data that has not been encrypted. In addition, the information management device 10 may perform an encoding function for converting data in a predetermined or desired format, in order to input data that has been encrypted into the electronic device 31. In this regard, the encryption/decryption module 12 and the encoding/decoding module 13 may be provided in the form of a software module to be executed on a processor. The information management device 10 may be formed as a single package, and an internal bus for connecting the processor to the security element may be provided inside the package.

Figure 2:
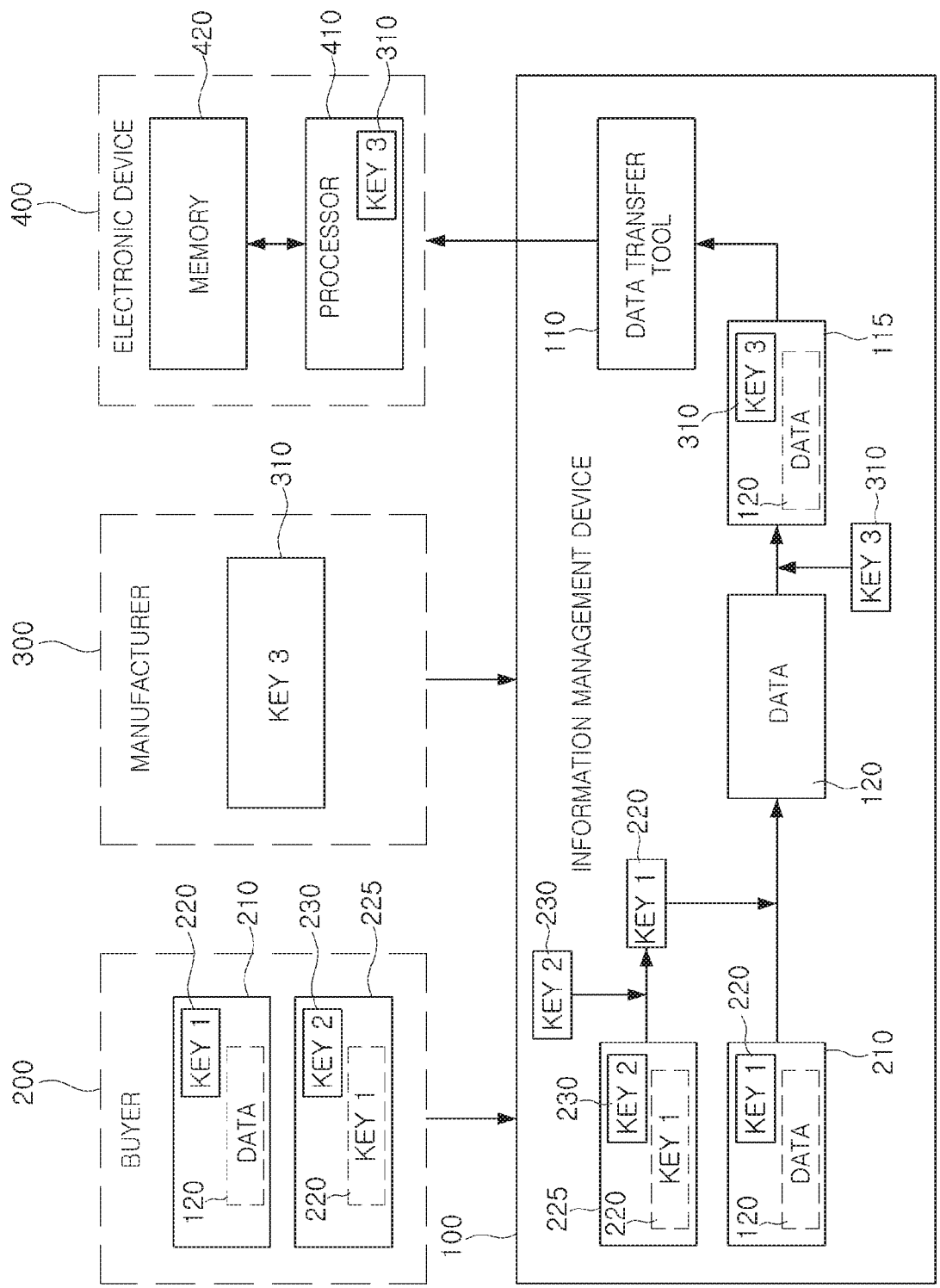
FIG. 2 is a block diagram provided to illustrate an operation according to a data management method according to some example embodiments.

FIG. 2 is a block diagram provided to illustrate an operation of an information management device according to some example embodiments.

With reference to FIG. 2, an information management device 100 may include a data transfer tool 110. The data transfer tool 110 may be an application or a program for transmitting specific data or information to an external device or module. In some example embodiments, the data transfer tool 110 may be executed on the information management device 100, or may be executed on a computer device provided separately from the information management device 100.

Hereinafter, with reference to FIG. 2, a process will be described, in which the information management device 100 receives data 120 from a buyer 200, encrypts the data, and inputs the data into an electronic device 400. In some example embodiments illustrated in FIG. 2, the buyer 200 may be a subject who buys the electronic device 400 manufactured by a manufacturer 300. The data 120 provided by the buyer 200 may include information desired to be input to the electronic device 400 in a manufacturing process of the electronic device 400. In other words, at the time when the buyer 200 buys the electronic device 400, the electronic device 400 may be in a state in which the electronic device stores the data 120 provided by the buyer 200. In addition, in order to prevent the data 120 from being disclosed during a process in which the data 120 is stored in the electronic device 400, it is necessary to prevent the data 120 from being leaked to the manufacturer 300 or to a data management company that manages and operates the information management device 100.

The buyer 200 may encrypt the data 120 with a first encryption key 220, to generate first transmission data 210. In this regard, when the first transmission data 210 is decrypted with the first encryption key 220, the data 120 may be extracted. In addition, the buyer 200 may encrypt the first encryption key 220 with a second encryption key 230, to generate a first transmission encryption key 225. The second encryption key 230 may be a transmission key for encrypting the first encryption key 220 in a transmission process.

The manufacturer 300 manufacturing the electronic device 400 may provide a third encryption key 310, and the third encryption key 310 may be stored in a processor 410 during a manufacturing process of the electronic device 400. In some example embodiments, the processor 410 may include IP security. The third encryption key 310 may be a transmission key in a manner similar to the second encryption key 230.

The information management device 100 may receive the second encryption key 230 and the third encryption key 310 from the buyer 200 and the manufacturer 300, respectively. The second encryption key 230 and the third encryption key 310 may be directly input to the information management device 100 by the buyer 200 and the manufacturer 300. The expression, "directly input to", used in relation to a method in which the second encryption key 230 and the third encryption key 310 are "directly input to" the information management device 100, refers not to an electronic information transmission method such as electronic mail, or the like, but to a method in which people directly input an encryption key.

In some example embodiments, the information management device 100 may be an HSM. In this case, it may be impossible for a person to perform an arbitrary operation from the outside to extract information contained in the information management device 100. Thus, the second encryption key 230, directly input to the information management device 100 by the buyer 200, is not known to a third party at all, other than the buyer 200, and the third encryption key 310, directly input to the information management device 100 by the manufacturer 300, is not known to a third party, other than the manufacturer 300, in a manner similar thereto.

The information management device 100 may receive the first transmission encryption key 225 from the buyer 200. The first transmission encryption key 225 may be transmitted to the information management device 100 in various electronic information transmission methods, including electronic mail. The information management device 100 may decrypt the first transmission encryption key 225, using the second encryption key 230 directly input by the buyer 200 to extract the first encryption key 220. As information contained in the information management device 100 is limited to being extracted only by a person performing an arbitrary operation from the outside, the first encryption key 220 may not be exposed even to the data management company operating the information management device 100.

On the other hand, the information management device 100 may receive the first transmission data 210 from the buyer 200. The first transmission data 210 may be transmitted in various electronic information transmission methods including electronic mail, in a manner similar to the first transmission encryption key 225. As the information management device 100 decrypts the first transmission data 210 using the first encryption key 220, the data 120 may be extracted.

The data 120 extracted from the first transmission data 210 may be data that has not been encrypted. In some example embodiments, the information management device 100 may be an HSM. In this case, the data 120 extracted in a decrypting process inside the information management device 100 may not be accessible from the outside. Thus, the possibility of leakage of the data 120 to the outside during a process in which the data 120 is stored in the information management device 100 may be significantly reduced.

The information management device 100 may encrypt the data 120 with the third encryption key 310. The third encryption key 310 may be an encryption key generated by the manufacturer 300 manufacturing the electronic device 400, and may be directly input to the information management device 100 by the manufacturer 300. The information management device 100 may encrypt the data 120 with the third encryption key 310 to generate second transmission data 115. The second transmission data 115 may be input to the electronic device 400 by the data transfer tool 110. In some example embodiments, the data transfer tool 110 may be an application or a program to be executed by a computer device, and may be executed by a computer device provided separately from the information management device 100.

The electronic device 400 may include a processor 410 and a memory 420, and may be a semiconductor device such as an application processor (AP), a central processing unit (CPU), or the like. The processor 410 may store the third encryption key 310 provided by the manufacturer 300, and the third encryption key 310 may be stored in the processor 410 during a manufacturing process of the electronic device 400. The processor 410 may decrypt the second transmission data 115, transmitted by the data transfer tool 110, using the third encryption key 310. By the decrypting process, the processor 410 may extract the data 120 from the second transmission data 115, and may store the data 120 in the memory 420.

According to some example embodiments, during a process in which the data 120 provided by the buyer 200 is stored in the information management device 100, the first encryption key 220 and the second encryption key 230 may be used. In detail, the data 120 may be encrypted with the first encryption key 220, the first encryption key 220 may be encrypted with the second encryption key 230 again, and the second encryption key 230 may be directly input to the information management device 100 by the buyer 200. Thus, even when the first transmission data 210 and the first transmission encryption key 225, transmitted to the information management device 100 by the buyer 200, are leaked to the outside, as the first encryption key 220 cannot be decrypted with the first transmission encryption key 225 without the second encryption key 230, the data 120 is prevented from being leaked to the outside.

In addition, the information management device 100 may encrypt the data 120 with the third encryption key 310, before a process in which the data 120 is input to the electronic device 400. The third encryption key 310 may be directly input to the information management device 100 by the manufacturer 300, while being stored in the processor 410 of the electronic device 400 by the manufacturer 300 in a manufacturing process of the electronic device 400. Furthermore, as the second transmission data 115, generated by encrypting the data 120 with the third encryption key 310, is input to the electronic device 400 by the data management company operating the information management device 100, the possibility of the second transmission data 115 being leaked to a data management company which does not know the third encryption key 310 may be excluded. In addition, as the information management device 100 is implemented as an HSM, the data 120 is prevented from being leaked from the information management device 100.

Thus, as a data management method according to some example embodiments is used, the data 120 which the buyer 200 wants to store in the electronic device 400 may be safely transmitted to the electronic device 400 without possibility of leakage. In addition, the data 120 which the buyer 200 desires to store in the electronic device 400 may be injected to the electronic device 400 by the information management device 100 instead of by the buyer 200 or the manufacturer 300. Thus, after a large number of electronic devices 400 having the same specifications are supplied from the manufacturer 300, the data 120 provided by the buyer 200 is injected to the electronic device 400. Thus, without a change in a hardware design, an electronic device, in the form of a half-finished product or a finished product, storing the data 120 which the buyer 200 desires therein, may be efficiently manufactured.

Figure 3:
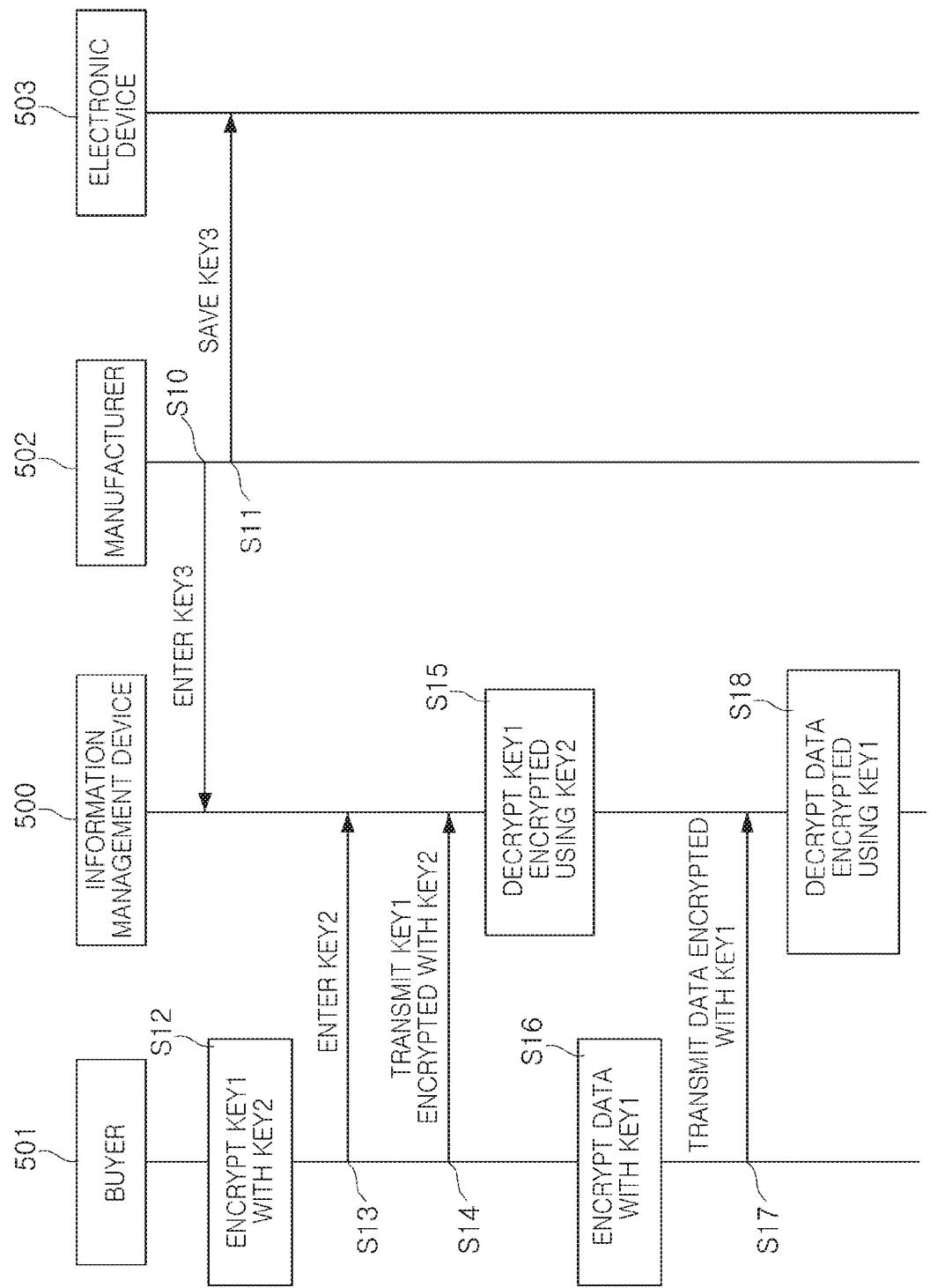
FIGS. 3 and 4 are views provided to illustrate a data management method according to some example embodiments.
Figure 4:
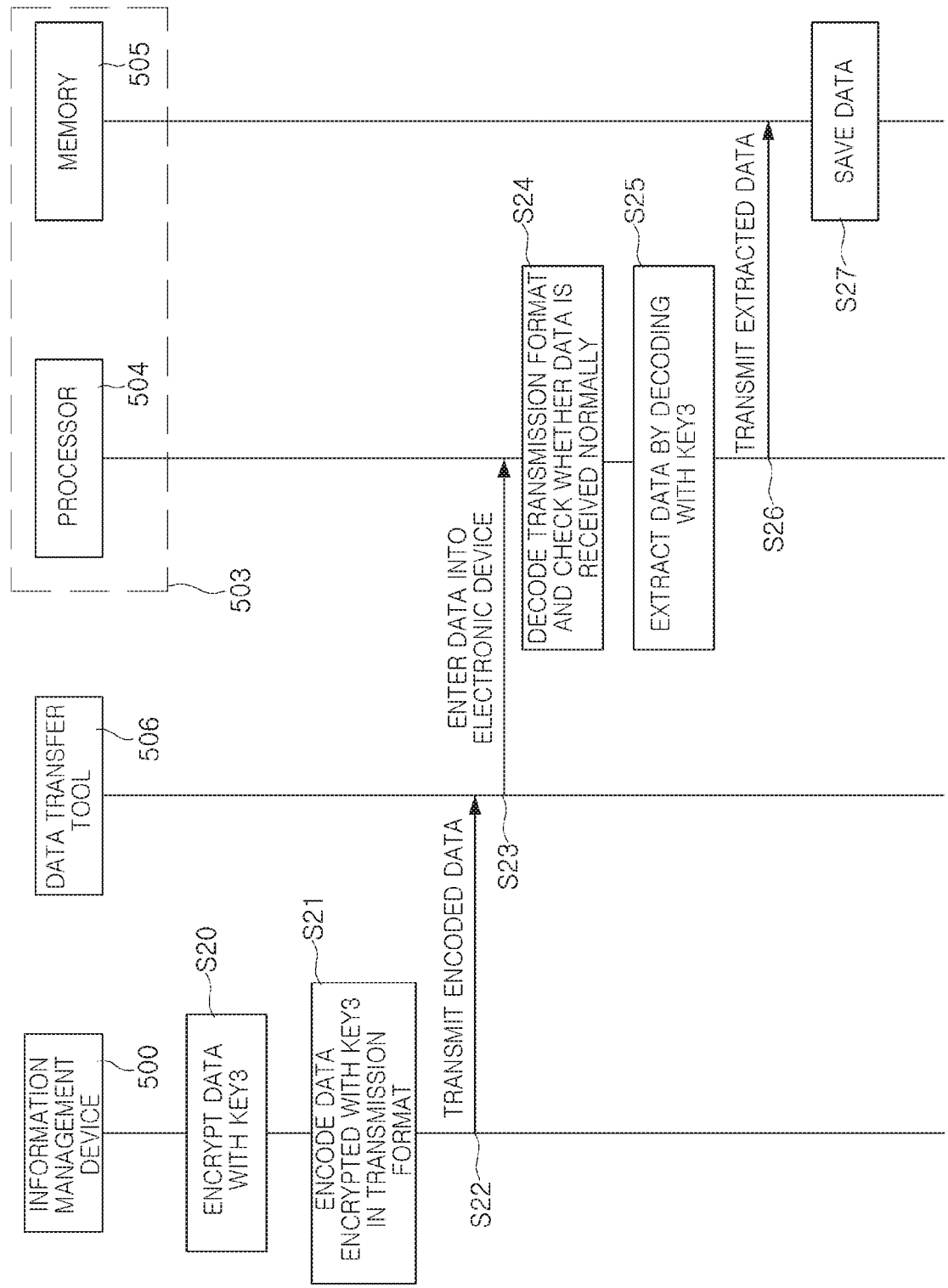

FIGS. 3 and 4 are views provided to illustrate an information management method according to some example embodiments. In some example embodiments, FIG. 3 is a view provided to illustrate a method of storing data in an information management device 500, and FIG. 4 is a view provided to illustrate a method of storing data in an electronic device by the information management device 500.

First, with reference to FIG. 3, a manufacturer 502 may store a third encryption key KEY 3 in the information management device 500 (S10). In some example embodiments, the manufacturer 502 may be a subject manufacturing and selling an electronic device 503. In addition, the manufacturer 502 may store the third encryption key KEY 3 even in the electronic device 503, during a manufacturing process of the electronic device 503 (S11).

On the other hand, a buyer 501 may encrypt a first encryption key KEY 1 with a second encryption key KEY 2 (S12), while directly inputting the second encryption key KEY 2 to the information management device 500 (S13). The information management device 500 may be implemented as a server, or the like, and may include an HSM. In some example embodiments, the buyer 501 actually dispatches manpower to allow the second encryption key KEY 2 to be directly input to the information management device 500.

When the second encryption key KEY 2 is directly input to and stored in the information management device 500, the information management device 500 may receive the first encryption key KEY 1 from the buyer 501 (S14). The first encryption key KEY 1 which the information management device 500 receives in an operation of S14, may be in a state in which the first encryption key is encrypted with the second encryption key KEY 2. The first encryption key KEY 1 may be transmitted in the form of electronic mail, or in the form of electronic information through a computer-readable recording medium such as a removable storage device, or the like, for example, in file form.

As the information management device 500 decrypts the first encryption key KEY 1 encrypted with the second encryption key KEY 2 and extracts the first encryption key KEY 1 (S15). The information management device 500 has the second encryption key KEY 2 directly input by the buyer 501, thereby decrypting the first encryption key KEY 1 encrypted with the second encryption key KEY 2.

On the other hand, the buyer 501 may encrypt data to be stored in the electronic device 503 to be purchased with the first encryption key KEY 1 (S16), and may transmit data that has been encrypted to the information management device 500 (S17). Data encrypted with the first encryption key KEY 1 may be transmitted in the form of electronic mail, or in the form of electronic information through a computer-readable recording medium such as a removable storage device, or the like, for example, in file form, in an operation of S17.

The information management device 500 may decrypt data transmitted in S17, using the first encryption key KEY 1 extracted in S15 (S18). The information management device 500 may include an HSM, and pieces of information that have already been input to the information management device 500 may not be leaked to the outside. Thus, information, which may be leaked externally during a process in which data is stored in the information management device 500, may only be the second encryption key KEY 2 which the buyer 501 directly inputs to the information management device 500.

In other words, the first encryption key KEY 1 and data may be stored in the information management device 500, while the data management company operating the information management device 500, in addition to the buyer 501 and the manufacturer 502, do not even know the first encryption key KEY 1 and the data. Thus, while the possibility of data leakage is significantly reduced, data provided by the buyer 501 may be stored in the information management device 500.

Next, with reference to FIG. 4, the information management device 500 may encrypt data with the third encryption key KEY 3 (S20). The third encryption key KEY 3 may be an encryption key that has been pre-stored in the electronic device 503 during a manufacturing process of the electronic device 503 by a manufacturer of the electronic device 503. In some example embodiments, the information management device 500 may encrypt the data in a predetermined or desired block unit using an Advanced Encryption Standard in Cipher Block Chaining (AES-CBC) algorithm.

The information management device 500 may encode data encrypted with the third encryption key KEY 3 in a predetermined or desired transmission format (S21). The transmission format may vary depending on a type of the electronic device 503, a data format readable in the electronic device 503, the capacity of data, and the like.

The information management device 500 may encode data encrypted with the third encryption key KEY 3 in the transmission format to transmit the data to a data transfer tool 506 (S22), and the data transfer tool 506 may inject data encoded in the transmission format to the electronic device 503 (S23). The data transfer tool 506 may be an application or a computer program to be executed on the information management device 500, a separate computer device, or the like.

The electronic device 503 may include a processor 504, a memory 505, and the like, and the processor 504 may be implemented as IP security. Data injected by the data transfer tool 506 in S23 is transmitted to the processor 504, after the processor 504 decodes data that has been encoded in the transmission format, it is determined whether the data has been normally transmitted (S24).

In some example embodiments, the transmission format may include verification information for determining whether the data is to be transmitted normally. The header may include at least one of a data format, an initialization vector, a length of the third encryption key KEY 3 and information of a Hash-based Message Authentication Code (HMAC). According to various example embodiments, the transmission format may further include information indicating a length of data encoded in the transmission format and information of a cyclic redundancy check (CRC) checksum.

In an operation of S24, when it is determined that data has been transmitted normally, as the processor 504 performs a decrypting process using the third encryption key KEY 3 which has been pre-input in a manufacturing process, data encrypted with the third encryption key KEY 3 may be extracted (S25). The data that has been extracted may be transmitted to the memory 505 (S26), and the memory 505 may store the data (S27).

During a process in which the information management device 500 injects data to the electronic device 503, the data may be encrypted with the third encryption key KEY 3 to reduce or prevent leakage. The third encryption key KEY 3 may be information which only the manufacturer of the electronic device 503 knows. In addition, as the manufacture and sale of the electronic device 503 have already been completed, it may be impossible, even for a manufacturer of the electronic device, to access data that has been stored in the electronic device 503. Thus, the possibility of leakage of data encrypted with the third encryption key KEY 3 and transmitted to the electronic device 503, may be significantly reduced.

Figure 5:
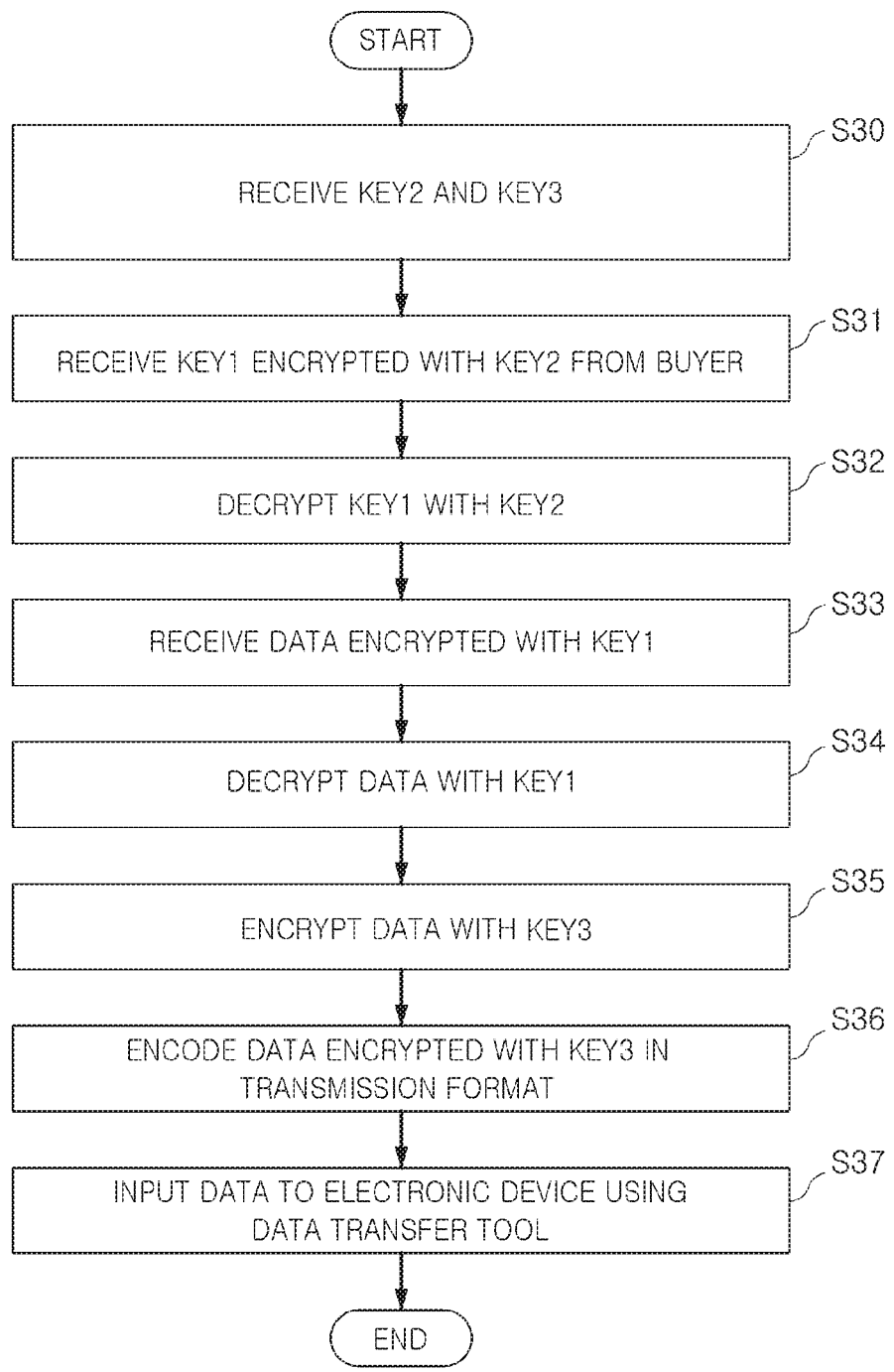
FIG. 5 is a flow diagram provided to illustrate a data management method according to some example embodiments.

FIG. 5 is a flow diagram provided to illustrate a data management method according to some example embodiments.

With reference to FIG. 5, a data management method according to some example embodiments may be begun by receiving a second encryption key KEY 2 and a third encryption key KEY 3 through an information management device (S30). Each of the second encryption key KEY 2 and the third encryption key KEY 3 may be a transmission key required for encrypting data when data is received from the outside or data is transmitted to the outside.

In some example embodiments, the information management device may receive the second encryption key KEY 2 from a buyer, and may receive the third encryption key KEY 3 from a manufacturer of an electronic device. In some example embodiments illustrated in FIG. 5, the buyer inputting the second encryption key KEY 2 to the information management device may be a subject who desires to purchase an electronic device manufactured by the manufacturer. Each of the second encryption key KEY 2 and the third encryption key KEY 3 may be input in a method in which the buyer and the manufacturer dispatch manpower directly to allow the manpower to manually input a key to an information management device.

The information management device may receive a first encryption key KEY 1 encrypted with the second encryption key KEY 2 from the buyer (S31). The information management device may decrypt the first encryption key KEY 1 received in S31, using the second encryption key KEY 2 (S32), directly received by the buyer in S30. When an operation of S32 is completed, the information management device may know the first encryption key KEY 1 and the second encryption key KEY 2, and the first encryption key KEY 1 and the second encryption key KEY 2 may not be accessed from the outside, due to characteristics of the information management device. In other words, it may be impossible, even for a company operating the information management device, to access the first encryption key KEY 1 and the second encryption key KEY 2.

The information management device may receive data encrypted with the first encryption key KEY 1 from the buyer (S33). The information management device may decrypt data received in S33, using the first encryption key KEY 1 decrypted in S32 (S34). When an operation of S34 is completed, data that has not been encrypted may be stored in the information management device. However, due to characteristics of an information management device including an HSM, access to data may not be allowed from the outside.

The information management device may encrypt data using the third encryption key KEY 3 input in S30 (S35). Data encrypted with the third encryption key KEY 3 in S35 may be encoded in a predetermined or desired transmission format (S36), and may be input to an electronic device through a data transfer tool (S37). The transmission format may include verification information for confirming whether an input process has been performed normally by means of the data transfer tool, and the verification information may be included in the form of a header in the format.

Figure 6:
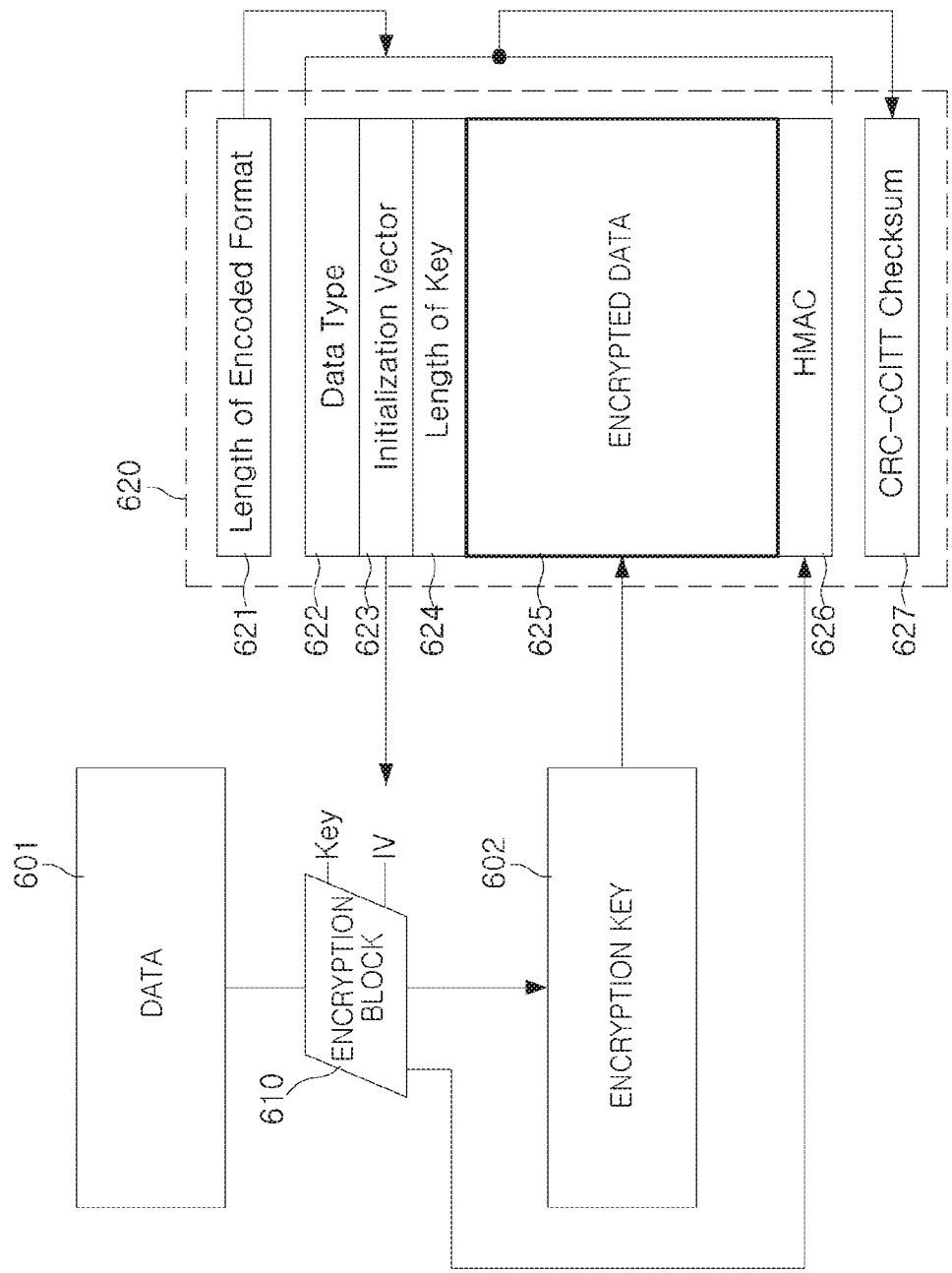
FIG. 6 is a view provided to illustrate a transmission format of data applied to a data management method according to some example embodiments.

FIG. 6 is a view provided to illustrate a transmission format of data applied to an information management method according to some example embodiments.

In some example embodiments, data 601 may be encrypted by an encryption block 610, which is present in the information management device. In some example embodiments, the encryption block 610 may encrypt the data 601 in an AES-CBC method, and a predetermined or desired encryption key 602 may be used in the process described above. The encryption key 602 may be a type of transmission key provided by a subject different from the subject providing the data 601.

A transmission format 620 of data according to some example embodiments may include a plurality of data fields 621 to 627. With reference to FIG. 6, a length of the transmission format 620 that has been encoded may be stored in a first field 621 of the transmission format 620, and a data type may be stored in a second field 622. An initialization vector (IV) value may be stored in a third field 623, and a length of the encryption key 602 may be stored in a fourth field 624.

Data that has been encrypted may be stored in a fifth field 625. In some example embodiments, the fifth field 625 may occupy the largest amount of storage area. Data stored in the fifth field 625 may be encrypted in a predetermined or desired block unit. In some example embodiments, the IV value stored in the third field 623 may set a different value for each block of data stored in the fifth field 625. On the other hand, a sixth field 626 may store an HMAC value, and the HMAC value may be a value provided for determining whether data has been forged during a transmission process of the data 601. On the other hand, a seventh field 627 of the transmission format 620 may be allocated to store checksum data required for error detection.

In some example embodiments, a length of a format stored in the first field 621 may be expressed by the number of bits of data allocated to the second to sixth fields 622 to 626, except for the seventh field 627 storing checksum data. On the other hand, the checksum data included in the seventh field 627 may also include information for checking whether there has been any error in the data included in the second to sixth fields 622 to 626.

As set forth above, according to some example embodiments of the present inventive concepts, in a data management method, after data that has been encrypted with a plurality of encryption keys is received and decrypted, the data is encrypted with a different encryption key from the plurality of encryption keys to be input to an electronic device. The electronic device decrypts the data that has been received, with the different encryption key stored in advance in the electronic device, thereby safely receiving and storing the data.

While some example embodiments have been shown and described above, it will be apparent to those skilled in the art that modifications and variations could be made without departing from the scope of the present disclosure, as defined by the appended claims.

What is claimed is:

1. A data management method comprising:
storing a second encryption key (KEK) into an information management device for encrypting a first encryption key and a third encryption key for data encryption;
decrypting the first encryption key by using the second encryption key (KEK), in response to receiving the first key encrypted by the second key;
decrypting data by using the first encryption key based on verifying input, in response to receiving the data encrypted with the first encryption key;
encrypting the decrypted data with the third encryption key; and
inputting the data encrypted with the third encryption key to an electronic device external to the information management device, wherein the first encryption key is different from the third encryption key.

2. The data management method of claim 1, wherein the method is executed by a Hardware Security Module (HSM).

3. The data management method of claim 1, wherein the data encrypted with the third encryption key is stored in an electronic device.

4. The data management method of claim 3, wherein the electronic device includes, a processor having the third encryption key stored in a manufacturing operation, and a memory configured to store the data.

5. The data management method of claim 4 further comprising:
decrypting the data by using the third encryption key by the processor; and
storing the decrypted data in the memory.

6. The data management method of claim 3 further comprising:
receiving and storing the third encryption key, the third encryption key being directly received from a manufacturer of the electronic device and stored.

7. The data management method of claim 3 further comprising: receiving and storing the second encryption key, the second encryption key being directly received from a buyer of the electronic device.

8. The data management method of claim 3, wherein the data includes information required to allow the electronic device to provide an Internet of Things (IoT) service.

9. The data management method of claim 3, wherein the data is encrypted with the third encryption key using an Advanced Encryption Standard in Cipher Block Chaining (AES-CBC) algorithm.

10. A data management method comprising:
receiving an encryption key and data at an information management device, the encryption key being encrypted with a first transmission key, the data being encrypted with the encryption key;
decrypting the encryption key using the first transmission key which is input directly by a user into the information management device;
in response to receiving the data at the information management device, decrypting the data with the encryption key based on verifying input and encrypting the decrypted data by using a second transmission key and the encryption key, the second transmission key being different from the first transmission key; and
inputting the encrypted data with the second transmission key, to an electronic device external to the information management device after encoding the data encrypted with the second transmission key in a transmission format.

11. The data management method of claim 10, wherein the transmission format includes verification information for verifying the inputting.

12. The data management method of claim 11, wherein the verification information includes at least one of a data format, an initialization vector, a length of the second transmission key, and Hash-based Message Authentication Code (HMAC) information.

13. The data management method of claim 11, further comprising:
extracting the verification information when the data is decoded by the electronic device, in response to the data encoded in the transmission format being input to the electronic device;
confirming the inputting, using the verification information, by the electronic device; and
decrypting the data encrypted with the second transmission key by the electronic device in response to determining that the inputting has been performed normally.

14. The data management method of claim 10, wherein the method is executed by an HSM.

15. The data management method of claim 14, wherein the encryption key and the first transmission key are input directly to the HSM by a buyer of the electronic device, and the second transmission key is input directly to the HSM by a manufacturer of the electronic device.

16. A data management method comprising:
receiving, from a user and via direct input of an information management device, a first key for key encryption and a second key;
receiving a third key encrypted with the first key;
decrypting at the information management device the third key using the first key;
in response to receiving data encrypted with the third key, decrypting the data with the third key based on verifying input; and encrypting the decrypted data with the second key; and
inputting the data encrypted with the second key to an electronic device external to the information management device, wherein the second key is different from the first key.

17. The data management method of claim 16 further comprising: encoding the data encrypted with the second key into a transmission format.

18. The data management method of claim 17, wherein the transmission format includes verification information for verifying the inputting.

19. The data management method of claim 18, wherein the verification information includes at least one of a data format, an initialization vector, a length of the second key, and Hash-based Message Authentication Code (HMAC) information.

20. The data management method of claim 18, further comprising:
extracting the verification information warm the data is decoded by the electronic device, in response to the data encoded in the transmission format being input to the electronic device;
confirming the inputting, using the verification information by the electronic device; and decrypting the data encrypted with the second key by the electronic device in response to determining that the inputting has been performed normally.

* * * * *